April 12, 1949.　　　S. S. SCHNELL　　　2,467,337
BOTTLE STERILIZER
Filed Oct. 5, 1946　　　　　　　　　　2 Sheets-Sheet 1
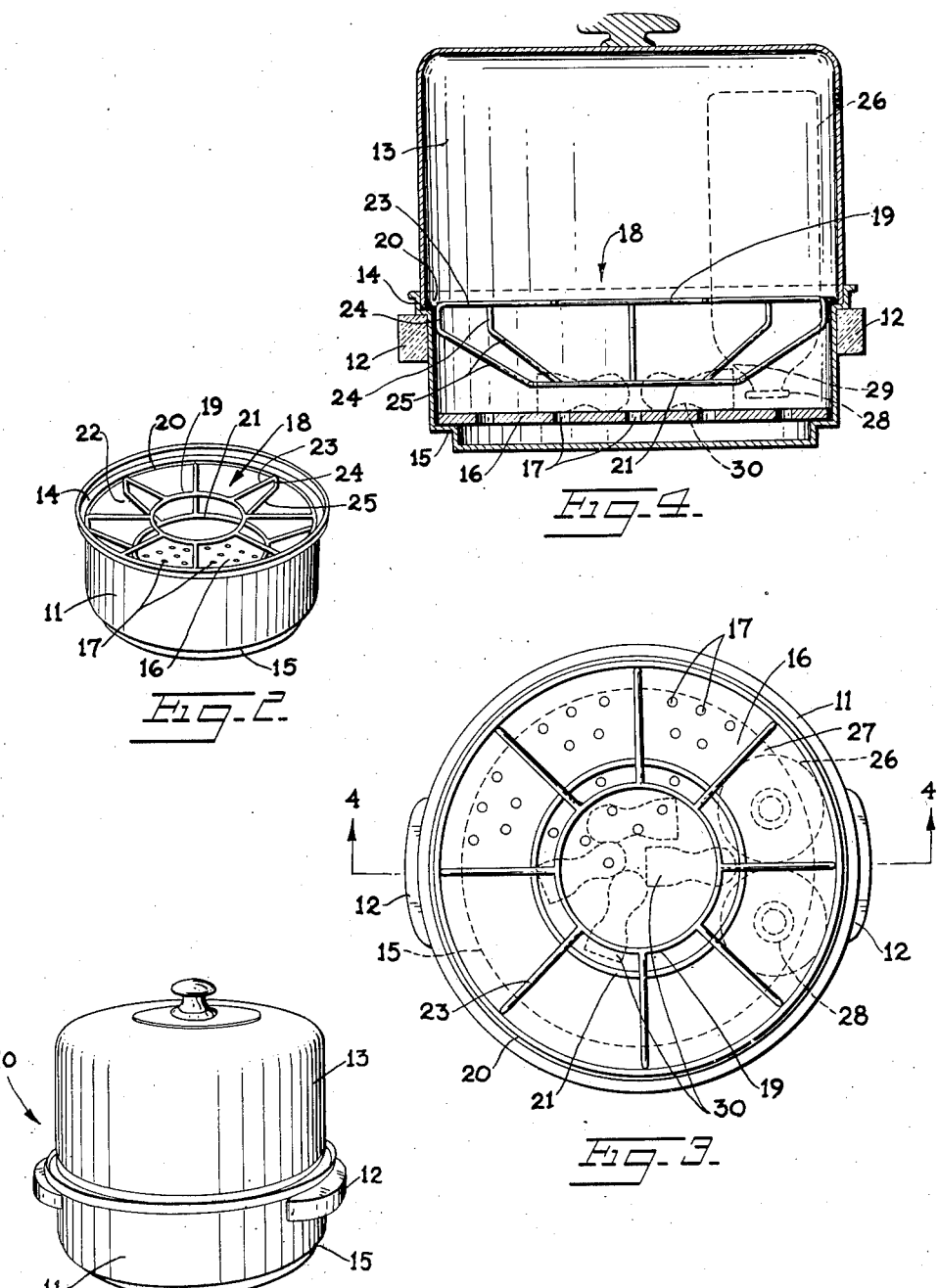
INVENTOR.
SOLOMON S. SCHNELL
BY
ATTORNEY April 12, 1949.　　　S. S. SCHNELL　　　2,467,337
BOTTLE STERILIZER Filed Oct. 5, 1946　　　　　　　　　　2 Sheets-Sheet 2

INVENTOR
SOLOMON S. SCHNELL
BY
ATTORNEY

Patented Apr. 12, 1949

2,467,337

UNITED STATES PATENT OFFICE 2,467,337

BOTTLE STERILIZER

Solomon S. Schnell, Brooklyn, N. Y.

Application October 5, 1946, Serial No. 701,492

12 Claims. (Cl. 21—95)

The present invention concerns a bottle sterilizer and refers more particularly to a sterilizer of the type comprising a comparatively shallow cylindrical pan and a comparatively deep cylindrical cover for the same, and removable means in the pan for supporting the bottles and other objects to be sterilized.

An object of the present invention is to provide a comparatively small sterilizer with a large capacity for bottles or other objects to be sterilized.

A further object is the provision of a sterilizer having support means for bottles and separate support means for nipples or such other items as it may be desired to sterilize at the same time.

Another object is that the bottle support means and bottles may be removed to make the other objects such as nipples easily accessible after sterilizing.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Fig. 1 is a perspective view of the improved sterilizer.

Fig. 2 is a perspective view of the same with the cover removed.

Fig. 3 is a plan view of the pan with the various support means in place therein.

Fig. 4 is a section on the line 4—4 of Fig. 3, with the cover added and sectioned on the same line.

Figure 5:
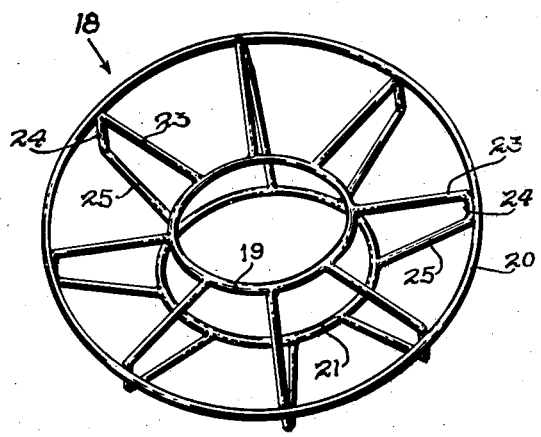
Fig. 5 is a perspective view of the bottle holding frame.

Referring now in detail to the drawings, the sterilizer 10 comprises a substantially cylindrical, comparatively shallow pan 11 having handles 12. A comparatively deep, substantially cylindrical cover 13 engages pan 11, fitting into an internal peripheral flange or shoulder 14 of the pan 11. Pan 11 is formed with a further internal shoulder 15 near the bottom thereof. A disc 16 formed with perforations 17 rests on shoulder 15.

A bottle holding and spacing frame 18, preferably of wire construction, is inserted in the pan 11. This frame comprises an inner annular member or ring 19, and an outer annular member or ring 20. The inner ring 19 is rigidly connected to the outer ring 20 by means of the spokes or bars 23, in an approximately common plane, and in concentric relation to said outer ring 20. A third ring 21 is connected to the outer ring 20 by means of the spokes or bars 25, which are formed with vertical portions 24 near their outer ends, and the third ring 21 is slightly larger than the inner ring 19, and is supported in concentric relation to the rings or annular members 19 and 20, but below the plane of the rings or members 19 and 20.

The upper spokes or bars 23 are disposed in approximate vertical alignment to the lower spokes or bars 25, and are spaced apart in radial relation to the rings or annular members so as to provide bottle receiving spaces or compartments 27.

In operation, disc 16 and frame 18 are placed within pan 11 with ring 20 resting on flange 14 and the frame 18 centered in pan 11 by the portions 24 engaging the side walls thereof. Bottles such as baby bottles indicated in dotted lines at 26 are then placed in the compartments 27 formed and defined by the wires 22. The mouths 28 of the bottles 26 are lowermost as shown in Fig. 4 and the sloping shoulders 29 of the bottles 26 engage the ring 21 and are supported thereby. The nipples indicated in dotted lines at 30 for bottles 26 are, as usual, when sterilizing, separated from the bottles and lie loosely on disc 16. Cover 13 is then put in place, resting on flange 14 outside ring 20.

Since the boiling water reaches only to the height of disc 16, complete sterilization by steam is thus made possible.

When sterilizing has been completed and the bottles 26 have been removed, the nipples 30 then become easily accessible on disc 16. Disc 16 serves the purpose of preventing scorching of nipples 30 and the fingers. This device is suitably constructed for sterilizing many other items such as, funnels, caps, covers, spoons, etc. at one time. Pan 11, disc 16 and cover 13 may be used alone to sterilize articles larger than will fit in compartments 27.

If desired the pan, cover and disc, may be used satisfactorily for other purposes, that is, as a food steamer, casserole, bun warmer, etc.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A bottle sterilizer comprising, in combination, a pan, a substantially flat, foraminated member, means for supporting said member close to the bottom of said pan, and a bottle supporting frame of open construction separate from said pan and said member and fitting within said pan above said member.

2. A bottle sterilized comprising, in combination, a pan, a substantially flat, foraminated member, means for supporting said member close to the bottom of said pan, and a bottle supporting frame of open construction separate from said pan and said member and fitting within said pan above said member and out of contact therewith.

3. A bottle sterilizer comprising, in combination, a comparatively shallow, substantially cylindrical pan, a comparatively deep, substantially cylindrical cover therefor, a substantially flat, foraminated member, means for supporting said member close to the bottom of said pan, and a bottle supporting frame of open construction separate from said pan and said member and fitting within said pan above said member and out of contact therewith.

4. A bottle sterilizer comprising, in combination, a comparatively shallow, substantially cylindrical pan, a comparatively deep, substantially cylindrical cover therefor, a substantially flat, foraminated member, means for supporting said member close to the bottom of said pan, and a bottle supporting frame of open construction separate from said pan and said member and fitting within said pan above said member and out of contact therewith.

5. A bottle sterilizer comprising, in combination, a pan, said pan being formed with a shoulder portion near the bottom thereof, a substantially flat, foraminated member adapted to rest loosely upon said shoulder portion, and a bottle supporting frame of open construction separate from said pan and said member and fitting within said pan above said member.

6. A bottle sterilizer comprising, in combination, a pan, said pan being formed with a shoulder portion near the bottom thereof, a substantially flat, foraminated member adapted to rest loosely upon said shoulder portion, and a bottle supporting frame of open construction separate from said pan and said member and fitting within said pan above said member and out of contact therewith.

7. A bottle sterilizer comprising, in combination, a pan, a substantially flat, foraminated member, means for supporting said member close to the bottom of said pan, and a bottle supporting frame of open construction separate from said pan and said member and fitting within said pan above said member, said frame comprising two concentric annular members extending in the same plane, a third annular member substantially concentric with the first two and extending in a substantially parallel plane, and members interconnecting said annular members.

8. A bottle sterilizer comprising, in combination, a pan, a substantially flat, foraminated member, means for supporting said member close to the bottom of said pan, and a bottle supporting frame of open construction separate from said pan and said member and fitting within said pan above said member, said frame comprising two concentric annular members extending in the same plane, a third annular member substantially concentric with and disposed beneath the first two in parallel relation thereto, and connecting members extending substantially radially between said first two mentioned annular members, said connecting members further extending substantially perpendicularly from the outer of said two members, said connecting members further extending substantially radially inwardly to said third annular member.

9. A bottle sterilizer comprising, in combination, a pan, a substantially flat, foraminated member, means for supporting said member close to the bottom of said pan, and a bottle supporting frame of open construction separate from said pan and said member and fitting within said pan above said member and out of contact therewith, said frame comprising two concentric annular members extending in the same plane, a third annular member substantially concentric with and disposed beneath the first two in parallel relation thereto and connecting members extending substantially radially between said first two mentioned annular members, said connecting members further extending substantially perpendicularly from the outer of said two members, said connecting members further extending substantially radially inwardly to said third annular member.

10. A bottle sterilizer comprising, in combination, a comparatively shallow, substantially cylindrical pan, a comparatively deep, substantially cylindrical cover therfor, a perforated disc, means for supporting said disc in closely spaced relation to the bottom of said pan, and a bottle supporting frame of open construction separate from said pan and said disc and fitting within said pan above said disc and out of contact therewith.

11. A bottle sterilizer comprising, in combination, a comparatively shallow, substantially cylindrical pan, a comparatively deep, substantially cylindrical cover therefor, a perforated disc, means for supporting said disc in closely spaced relation to the bottom of said pan, and a bottle supporting frame of open construction separate from said pan and said disc and fitting within said pan above said disc and out of contact therewith, said frame comprising two concentric annular members extending in the same plane, a third annular member intermediate in size between said two annular members and substantially concentric therewith and disposed beneath the first two annular members and in parallel relation thereto, and members interconnecting said annular members.

12. A bottle sterilizer comprising, in combination, a comparatively shallow, substantially cylindrical pan, a comparatively deep, substantially cylindrical cover therefor, a perforated disc, means for supporting said disc in closely spaced relation to the bottom of said pan, and a bottle supporting frame of open construction separate from said pan and said disc and fitting within said pan above said disc and out of contact therewith, said frame comprising two concentric annular members extending in the same plane, a third annular member intermediate in size between said two annular members and substantially concentric therewith and disposed beneath the first two annular members and in parallel relation thereto, and connecting members extending substantially radially between said first two mentioned annular members and further having portions extending perpendicularly from the outer of said two members and in turn continuing into portions extending radially inwardly and downwardly to said third annular member.

SOLOMON S. SCHNELL.

REFERENCES CITED

The following references are of record in the file of this patent:

UNITED STATES PATENTS

| Number | Name | Date |
|---|---|---|
| 1,028,320 | Boige | June 4, 1912 |
| 1,256,416 | Woods | Feb. 12, 1918 |
| 1,622,909 | Hatcher | Mar. 29, 1927 |
| 1,983,390 | Mueller | Dec. 4, 1934 |